United States Patent
Mitsuhori

(10) Patent No.: US 8,223,727 B2
(45) Date of Patent: Jul. 17, 2012

(54) ASSOCIATION METHOD, RELAY APPARATUS, COMMUNICATION MANAGEMENT APPARATUS AND BANDWIDTH ALLOCATION MANAGEMENT APPARATUS

(75) Inventor: Koichi Mitsuhori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1227 days.

(21) Appl. No.: 11/492,066

(22) Filed: Jul. 25, 2006

(65) Prior Publication Data

US 2007/0223435 A1    Sep. 27, 2007

(30) Foreign Application Priority Data

Mar. 27, 2006  (JP) .................................. 2006-086529

(51) Int. Cl.
*H04Q 7/24* (2006.01)
(52) U.S. Cl. ........ 370/338; 370/315; 370/329; 370/330; 370/331; 445/428; 445/432.1; 445/450; 445/451; 445/452.1
(58) Field of Classification Search .................. 370/338, 370/359.21–359.41
See application file for complete search history.

(56) References Cited

U.S. PATENT DOCUMENTS

| | | | |
|---|---|---|---|
| 5,926,469 A * | 7/1999 | Norstedt et al. ............... | 370/329 |
| 6,760,325 B1 * | 7/2004 | Hameleers et al. ............ | 370/352 |
| 2002/0184567 A1 * | 12/2002 | Arai et al. ...................... | 714/38 |
| 2003/0119519 A1 | 6/2003 | Madour et al. | |
| 2004/0110512 A1 * | 6/2004 | Lim .............................. | 455/450 |
| 2005/0047364 A1 | 3/2005 | Matsukura et al. | |
| 2005/0143087 A1 | 6/2005 | Touati et al. | |
| 2005/0147035 A1 * | 7/2005 | Sylvain et al. ................. | 370/230 |
| 2005/0227691 A1 * | 10/2005 | Pecen et al. .................. | 455/435.2 |
| 2006/0073840 A1 * | 4/2006 | Akgun et al. ................. | 455/456.3 |
| 2006/0084438 A1 * | 4/2006 | Kwon ............................ | 455/436 |

FOREIGN PATENT DOCUMENTS

| | | |
|---|---|---|
| EP | 1583389 A1 | 10/2005 |
| JP | 2005-080157 | 3/2005 |
| JP | 2005-229591 | 8/2005 |

OTHER PUBLICATIONS

Extended European Search Report dated Jul. 21, 2011 received in Application No. 06253880.6-1249/ 1841146.
"3rd Generation Partnership Project; Technical Specification Group Services and System Aspects; IP Multimedia Subsystem (IMS); Stage 2 (Release 7)" 3GPP Standard ; 3GPP TS 23.228, 3rd Generation Partnership Project (3GPP), Mobile Competence Centre; 650, Route Des Lucioles; F-06921 Sophia-Antipolis Cedex; France, No. V7.2.0, Dec. 1, 2005, pp. 1-192, XP050363296 pp. 44-45, paragraph 5.2.2.3.

* cited by examiner

*Primary Examiner* — Dai A Phuong
(74) *Attorney, Agent, or Firm* — Murphy & King, P.C.

(57) ABSTRACT

An association method for associating a communication management apparatus, a bandwidth allocation management apparatus, a relay apparatus and a wireless terminal with each other is disclosed. In the method, the wireless terminal sends a request for terminal registration including a communication management apparatus identifier to the relay apparatus; the relay apparatus sends a first request for terminal registration to the communication management apparatus specified by the communication management apparatus identifier; the communication management apparatus sends a bandwidth allocation management apparatus identifier to the relay apparatus; the relay apparatus sends a second request for terminal registration of the wireless terminal to the bandwidth allocation management apparatus specified by the bandwidth allocation management apparatus identifier; and the bandwidth allocation management apparatus stores association between the wireless terminal and the relay apparatus.

9 Claims, 12 Drawing Sheets

ASSOCIATION METHOD, RELAY APPARATUS, COMMUNICATION MANAGEMENT APPARATUS AND BANDWIDTH ALLOCATION MANAGEMENT APPARATUS

BACKGROUND OF THE INVENTION

1. Field of the Invention

The present invention relates to an association method for associating a communication management apparatus, a bandwidth allocation management apparatus, a relay apparatus, and a wireless terminal with each other, and, relates to the relay apparatus, the communication management apparatus and the bandwidth allocation management apparatus.

2. Description of the Related Art

In VoIP (Voice Over IP) communications in a wireless LAN environment, voice data is transmitted between a relay apparatus and a wireless apparatus at predetermined periodic intervals. In the communications, there is a possibility that delay occurs in the voice data when another wireless terminal starts to transmit a large amount of data. Therefore, it is required to be able to prioritize specific communication data such as voice data when a plurality of communications are performed.

There are following methods, for example, for performing control (to be referred to as "priority control" hereinafter) for sending/receiving specific communication packets preferentially in a wireless LAN.

Japanese Laid-Open Patent Application No. 2005-229591 (to be referred to as Patent Document 1) discloses a communication system in which identifying information of wireless terminals are stored in a SIP server, and the SIP server records communication states of wireless terminals so as to restrict the number of calls at the same access point to preserve bandwidth of voice packets.

Japanese Laid-Open Patent Application No. 2005-80157 (to be referred to as patent document 2) discloses a communication system for performing priority control using a bandwidth allocation management apparatus called an access point manager. FIG. 1 shows the communication system. The communication system shown in FIG. 1 includes a SIP (Session Initiation Protocol) server 1, an access point manager 3, access points 5a and 5b, and wireless terminals 7a and 7b. The SIP server 1 controls VoIP (Voice over Internet Protocol) communications based on SIP protocol. The access point manager 3 receives a request for terminal registration of the wireless terminal from the access point. In addition, the access point manager 3 sends a request for bandwidth allocation from the SIP server 1 to the access point. Each of the access points 5a and 5b deals with voice packets of the VoIP communication preferentially based on the request for bandwidth allocation from the access point manager.

In this communication system, when the wireless terminal 7a performs VoIP communications with the wireless terminal 7b based on the SIP protocol, the following procedure is carried out. When the wireless terminal 7a sends a connection request to the SIP server via the access point 5a in step 1, the SIP server 1 sends the request for bandwidth allocation to the access point manager 3 in step 3. The access point manager 3 sends the request for bandwidth allocation to the access points 5a and 5b that are an origination side and a destination side respectively in step 5, so that the access points 5a and 5b allocate bandwidth. As a result, VoIP communications from the wireless terminal 7a to the wireless terminal 7b can be performed.

In this communication system, a following phenomenon occurs when there are a plurality of SIP servers as shown in FIG. 2. It is assumed that the SIP server 1a, the access point manager 3a and the access point 5a are associated with each other, and that the SIP server 1b, the access point manager 3b and the access point 5b are associated with each other. When the wireless terminal 7a resides within a receiving range of the access point 5a, the wireless terminal 7a can perform priority controlled VoIP communication with the wireless terminal 7b according to the above-mentioned procedure. However, when the wireless terminal 7a moves to a receiving range of the access point 5b, the wireless terminal 7a sends a SIP signal to the SIP server 1a. This is because subscriber data of the wireless terminal 7a is registered in the SIP server 1a so that the wireless terminal 7a sends the SIP signal only to the SIP server 1a in which the wireless terminal 7a is registered. Therefore, the SIP server 1a sends a request for bandwidth allocation to the access point manager 3a, but, since the access point manager 3a does not manage the access point 5b, the request for bandwidth allocation ends in failure.

As mentioned above, since the wireless terminal recognizes the SIP server for sending the SIP signal, the request for bandwidth allocation ends in failure when the wireless terminal moves and accesses the previous SIP server. As a result, priority control cannot be performed.

SUMMARY OF THE INVENTION

The present invention is contrived in view of the above-mentioned problem, and an object of the present invention is to realize priority control even when a wireless terminals moves between access posits in a network including a plurality of communication management apparatuses (SIP servers).

The object can be achieved by an association method for associating a communication management apparatus, a bandwidth allocation management apparatus, a relay apparatus and a wireless terminal with each other in a network including the communication management apparatus for establishing a communication connection between wireless apparatuses, the bandwidth allocation management apparatus for sending a request for bandwidth allocation between wireless terminals to the relay apparatus according to a bandwidth allocation request from the communication management apparatus, a relay apparatus for performing bandwidth allocation between the wireless terminals according to the bandwidth allocation request from the bandwidth allocation management apparatus, and including the wireless terminal, wherein:

the wireless terminal sends a request for terminal registration including a communication management apparatus identifier to the relay apparatus;

the relay apparatus sends a first request for terminal registration of the wireless terminal to the communication management apparatus specified by the communication management apparatus identifier when receiving the request for terminal registration;

the communication management apparatus sends a bandwidth allocation management apparatus identifier to the relay apparatus when receiving the first request for terminal registration;

the relay apparatus sends a second request for terminal registration of the wireless terminal to the bandwidth allocation management apparatus specified by the bandwidth allocation management apparatus identifier when receiving the bandwidth allocation management apparatus identifier; and the bandwidth allocation management apparatus stores association between the wireless terminal and the relay apparatus when receiving the second request for terminal registration.

The object can be also achieved by an association method for associating a communication management apparatus, a bandwidth allocation management apparatus, a relay apparatus and a wireless terminal with each other in a network including the communication management apparatus for establishing a communication connection between wireless apparatuses, the bandwidth allocation management apparatus for sending a request for bandwidth allocation between wireless terminals to the relay apparatus according to a bandwidth allocation request from the communication management apparatus, a relay apparatus for performing bandwidth allocation between the wireless terminals according to the bandwidth allocation request from the bandwidth allocation management apparatus, and including the wireless terminal, wherein:

the wireless terminal sends a request for terminal registration including a communication management apparatus identifier and a bandwidth allocation management apparatus identifier to the relay apparatus;

the relay apparatus sends a first request for terminal registration of the wireless terminal to the bandwidth allocation management apparatus specified by the bandwidth allocation management apparatus identifier when receiving the request for terminal registration;

the bandwidth allocation management apparatus stores association between the wireless terminal and the relay apparatus when receiving the first request for terminal registration, and sends a second request for terminal registration of the wireless terminal to the communication management apparatus specified by the communication management apparatus identifier when receiving the first request for terminal registration; and the communication management apparatus stores association between the wireless terminal and the bandwidth allocation management apparatus when receiving the second request for terminal registration.

The object can be also achieved by an association method for associating a communication management apparatus, a bandwidth allocation management apparatus, a relay apparatus and a wireless terminal with each other in a network including the communication management apparatus for establishing a communication connection between wireless apparatuses, the bandwidth allocation management apparatus for sending a request for bandwidth allocation between wireless terminals to the relay apparatus according to a bandwidth allocation request from the communication management apparatus, a relay apparatus for performing bandwidth allocation between the wireless terminals according to the bandwidth allocation request from the bandwidth allocation management apparatus, and including the wireless terminal, wherein:

the wireless terminal sends a request for terminal registration including a communication management apparatus identifier to the relay apparatus;

the relay apparatus derives a bandwidth allocation management apparatus identifier from the communication management apparatus identifier when receiving the request for terminal registration, and sends a first request for terminal registration of the wireless terminal to the bandwidth allocation management apparatus specified by the bandwidth allocation management apparatus identifier;

the bandwidth allocation management apparatus stores association between the wireless terminal and the relay apparatus when receiving the first request for terminal registration, and sends a second request for terminal registration to the communication management apparatus specified by the communication management apparatus identifier; and the communication management apparatus stores association between the wireless terminal and the bandwidth allocation management apparatus when receiving the second request for terminal registration.

The object can be also achieved by an association method for associating a communication management apparatus, a bandwidth allocation management apparatus, a relay apparatus and a wireless terminal with each other in a network including the communication management apparatus for establishing a communication connection between wireless apparatuses, the bandwidth allocation management apparatus for sending a request for bandwidth allocation between wireless terminals to the relay apparatus according to a bandwidth allocation request from the communication management apparatus, a relay apparatus for performing bandwidth allocation between the wireless terminals according to the bandwidth allocation request from the bandwidth allocation management apparatus, and including the wireless terminal, wherein:

the wireless terminal sends a request for terminal registration including a communication management apparatus identifier to the relay apparatus;

the relay apparatus sends a first request for terminal registration of the wireless terminal to the bandwidth allocation management apparatus specified by a bandwidth allocation management apparatus identifier when receiving the request for terminal registration;

the bandwidth allocation management apparatus stores association between the wireless terminal and the relay apparatus when receiving the first request for terminal registration when receiving the first request for terminal registration, and sends a second request for terminal registration of the wireless terminal to the communication management apparatus specified by the communication management apparatus identifier; and a communication management apparatus stores association between the wireless terminal and the bandwidth allocation management apparatus when receiving the second request for terminal registration.

In the present invention, the relay apparatus, the communication management, and the bandwidth allocation management apparatus used in the association method can be also provided.

According to embodiments of the present invention, the priority control can be realized even when a wireless terminals moves between access posits in a network including a plurality of communication management apparatuses (SIP servers).

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

First Embodiment

Figure 1:
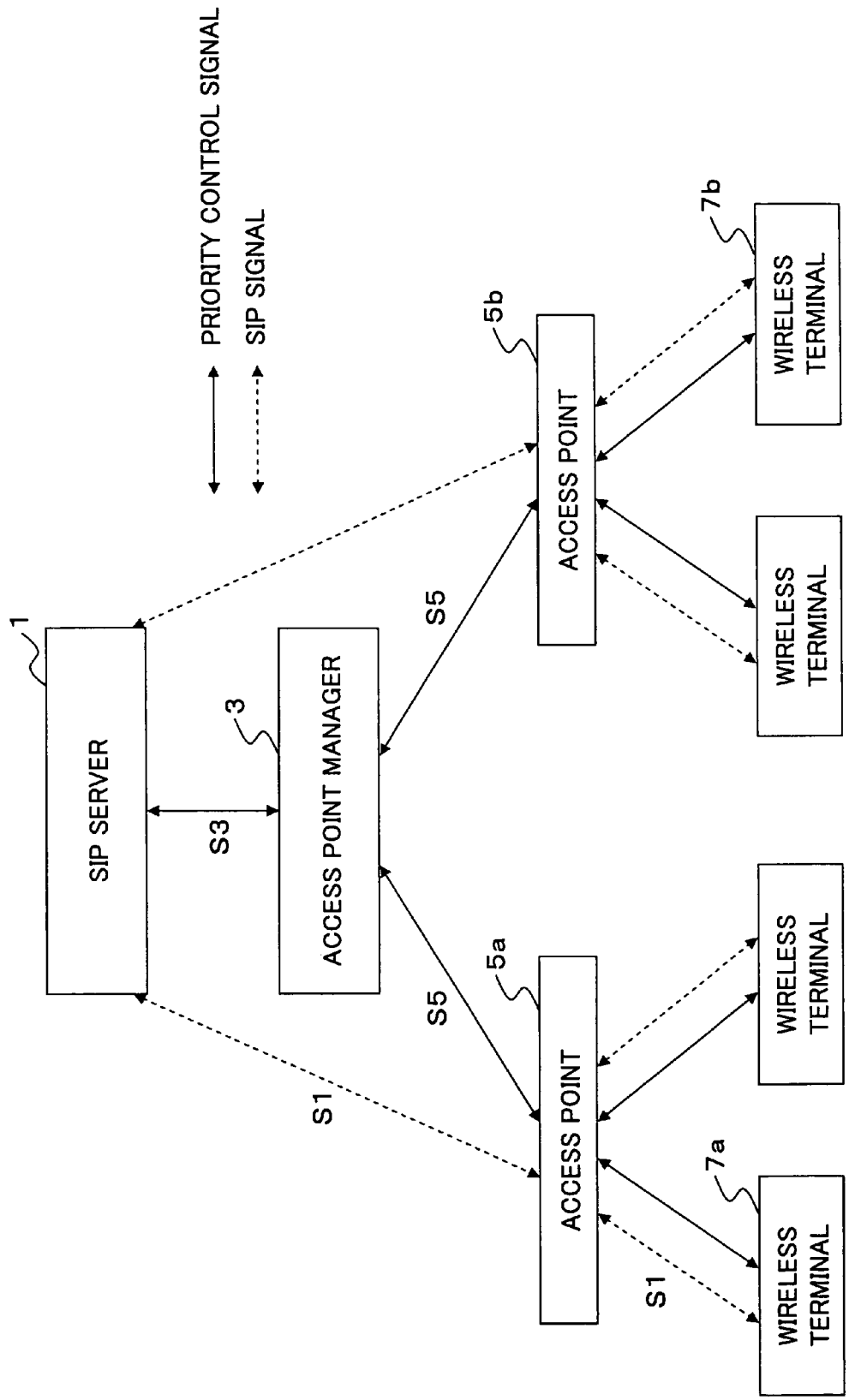
FIG. 1 shows a communication system that provides VoIP communications.
Figure 2:
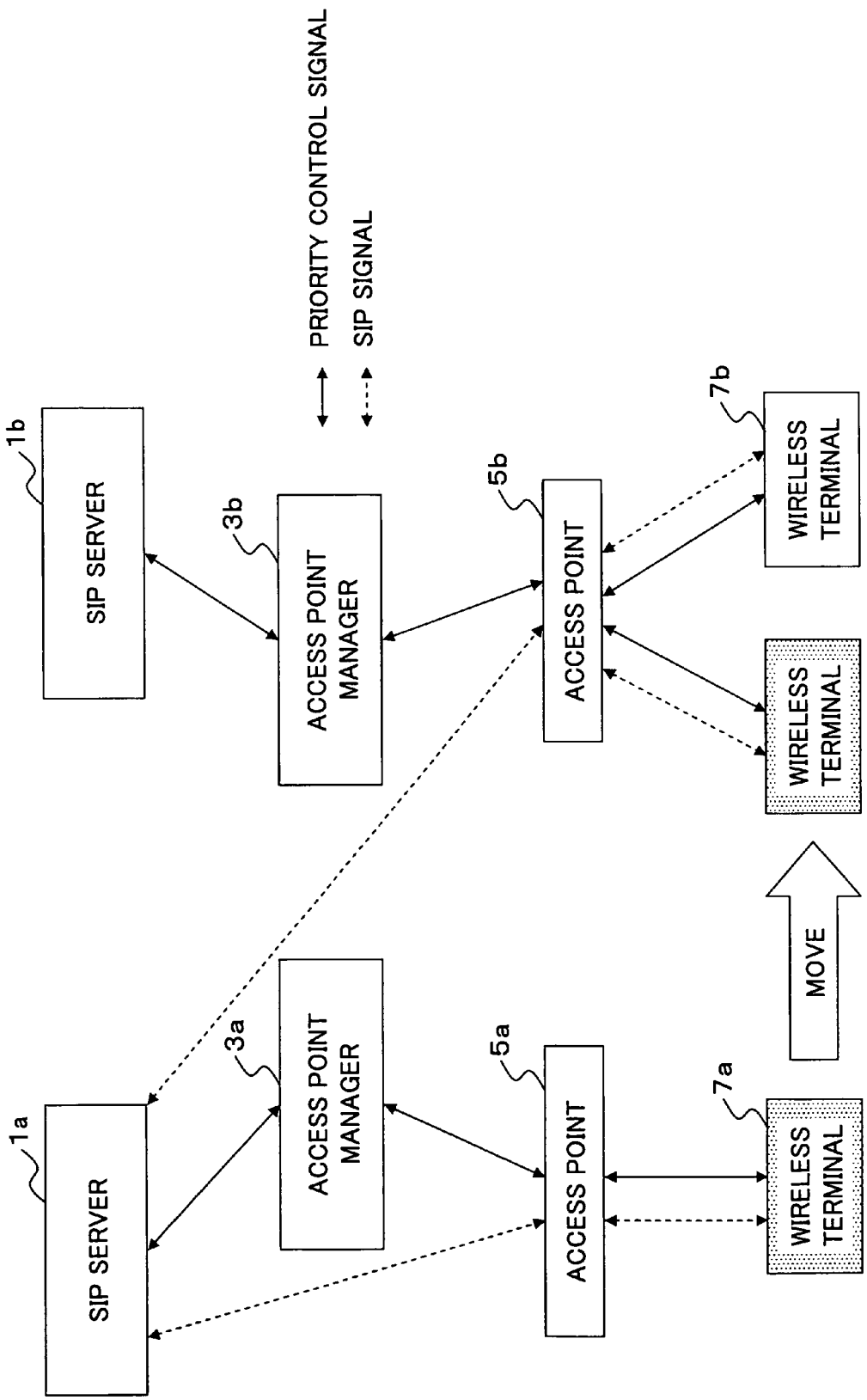
FIG. 2 shows connection relationship when a wireless terminal moves in the communication system shown in FIG. 1.

The first embodiment of the present invention is described with reference to FIGS. 3 and 4. In the first embodiment, a scheme is described in which a SIP server, an access point manager, an access point and a wireless terminal are associated with each other even in the environment shown in FIG. 2. Such association is performed based on terminal registration when the wireless terminal connects to the access point by wireless. More particularly, an address of the access point manager (to be referred to as APM (access point manager) address hereinafter) is stored in the SIP server beforehand so that the SIP server sends the APM address to the access point at the time of terminal registration of the wireless terminal.

Figure 3:
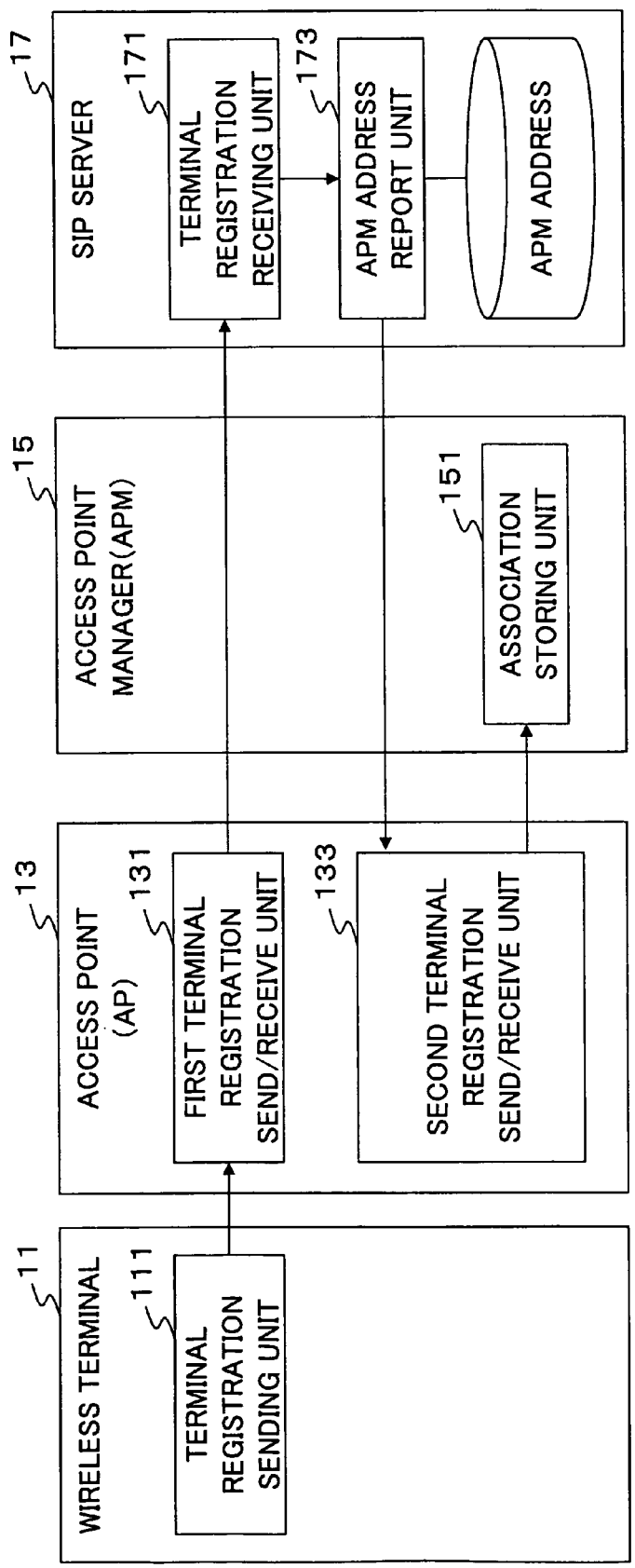
FIG. 3 is a block diagram showing the communication system of the first embodiment of the present invention.

FIG. 3 is a block diagram showing the whole of the communication system of the first embodiment of the present invention. This communication system includes a wireless terminal 11, an access point 13, an access point manager 15 and a SIP server 17.

The wireless terminal includes a terminal registration sending unit 111 for sending a request for terminal registration of the wireless terminal.

The access point 13 includes a first terminal registration send/receive unit 131 and a second terminal registration send/receive unit 133. The first terminal registration send/receive unit 131 sends a request for terminal registration to the SIP server 17 when receiving the request for terminal registration from the wireless terminal 11. The second terminal registration send/receive unit 133 sends a request for terminal registration to the access point manager 15 when receiving an APM address from the SIP server 17.

The access point manager 15 includes a storing unit 151 for associating the wireless terminal 11 with the access point 13 and storing them when receiving the request for terminal registration from the access point 13.

The SIP server 17 includes a terminal registration receiving unit 171 for receiving the request for terminal registration from the access point 13, and an APM address report unit 173 for reporting the APM address that is stored beforehand when receiving the request for terminal registration from the access point 13.

Figure 4:
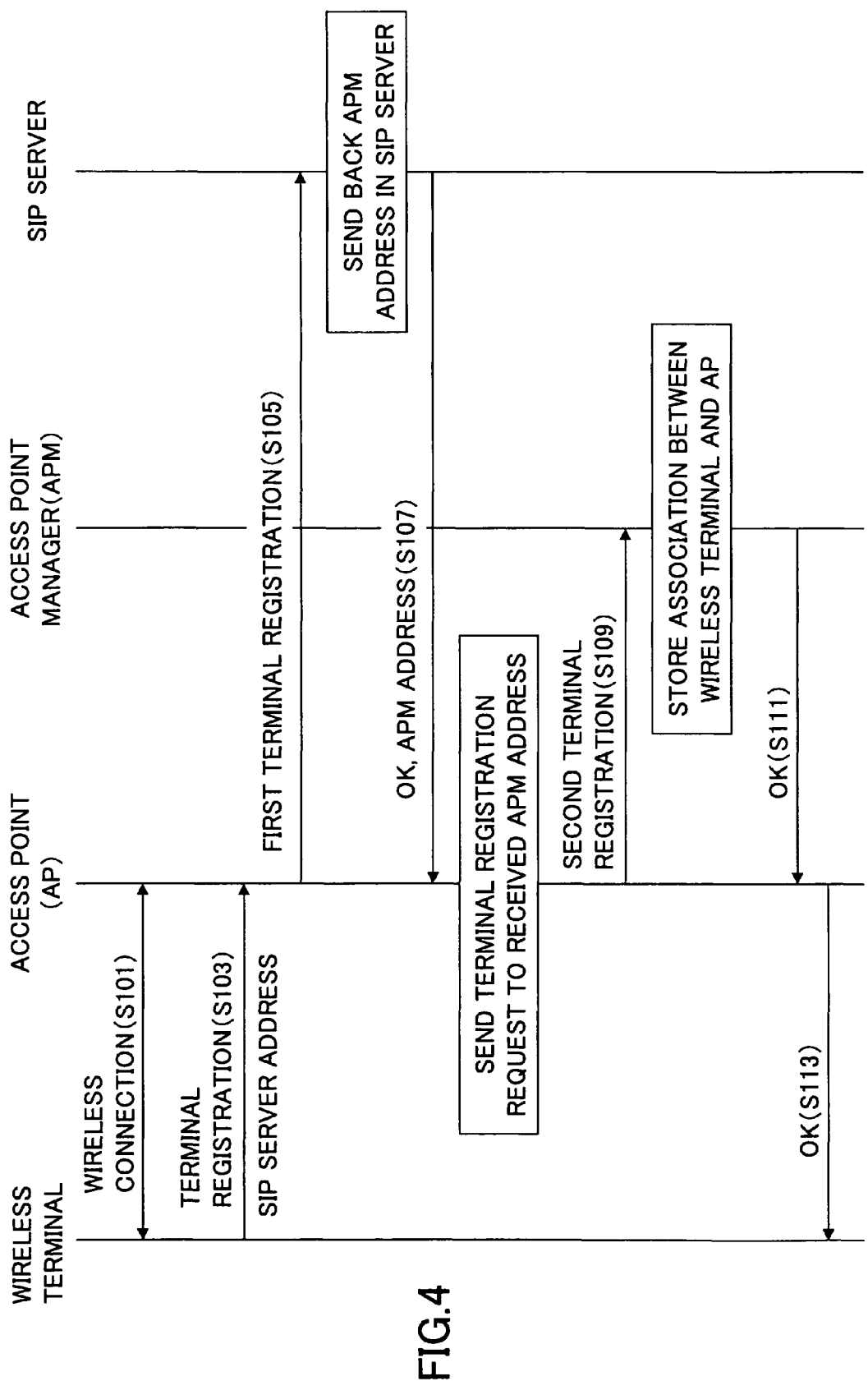
FIG. 4 is a flowchart showing process procedure of the communication system of the first embodiment of the present invention.

FIG. 4 shows a flowchart showing process procedure of the communication system.

When the wireless terminal connects to the access point by wireless in step 101, the wireless terminal sends a request for terminal registration to the access point in step 103. The request for terminal registration includes the address of the SIP server. The access point sends the request for terminal registration to the specified SIP server in step 105. Since an APM address is stored in the SIP server beforehand, the SIP server sends the APM address to the access point after performing terminal registration in step 107. The access point sends a request for terminal registration to the received APM address in step 109. Since the access point manager can know association between the wireless terminal and the access point, so that the access point manager stores the association, and sends OK to the access point as a response to the request for the terminal registration in step 111. The access point sends OK to the wireless terminal as a response to the request for the terminal registration in step 113.

As mentioned above, according to the first embodiment, since the APM address is sent from the SIP server to the access point when performing terminal registration, the access point can specify the access point manager, so that association of each apparatus can be realized. Therefore, even when the wireless terminal moves, the terminal registration is performed at the moving destination so that the association can be realized, and priority control of the VoIP communication can be realized.

Second Embodiment

In the following, the second embodiment of the present invention is described with reference to FIGS. 5 and 6. In the second embodiment, a scheme is described in which the SIP server, the access point manager, the access point and the wireless terminal can be associated with each other even in the environment shown in FIG. 2. Such association is performed in terminal registration when the wireless terminal connects to the access point by wireless. More particularly, the address of the access point manager (to be referred to as APM address hereinafter) is stored in the wireless terminal beforehand, and the wireless terminal reports the APM address to the access point at the time of terminal registration of the wireless terminal.

Figure 5:
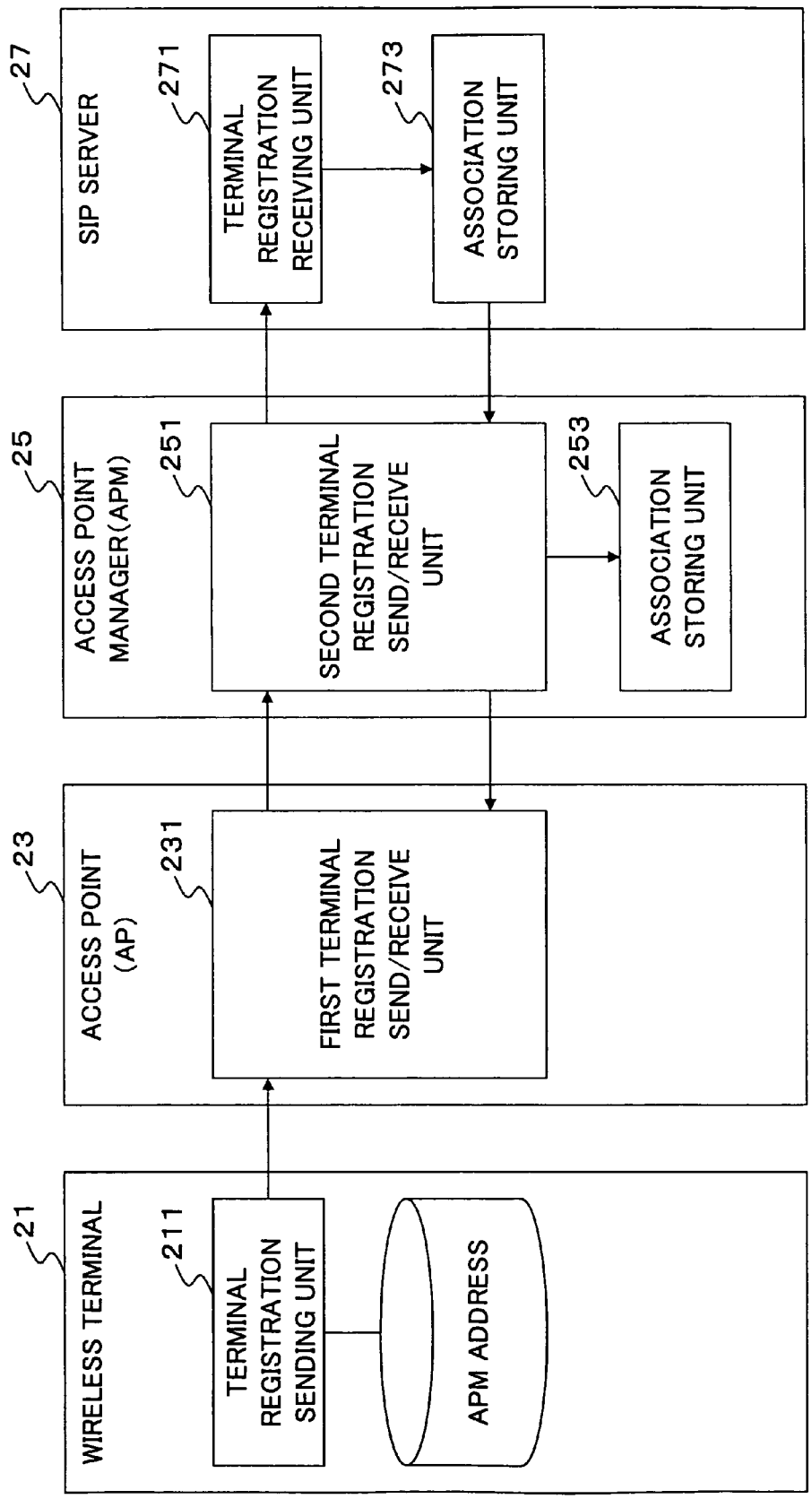
FIG. 5 is a block diagram showing the communication system of the second embodiment of the present invention.

FIG. 5 is a block diagram showing the whole of the communication system of the second embodiment. This communication system includes a wireless terminal 21, an access point 23, an access point manager 25 and a SIP server 27.

The wireless terminal 21 includes a terminal registration sending unit 211 for sending a request for terminal registration of the wireless terminal by adding the APM address that is stored beforehand.

The access point 23 includes a first terminal registration send/receive unit 231 for sending a request for terminal registration to the access point manager 25 when receiving the request for terminal registration from the wireless terminal 21.

The access point manager 25 includes a second terminal registration send/receive unit 251 for sending a request for terminal registration to the SIP server 27 when receiving the request for terminal registration from the access point 23, and an association storing unit 253 for associating the wireless terminal 21 with the access point 23 and storing them when receiving the request for terminal registration from the access point 23.

The SIP server 27 includes a terminal registration receiving unit 271 for receiving a request for terminal registration from the access point manager 25, and an association storing unit 273 for associating the wireless terminal 21 with the access point manager 25 and storing the association when receiving the request for terminal registration from the access point 25.

Figure 6:
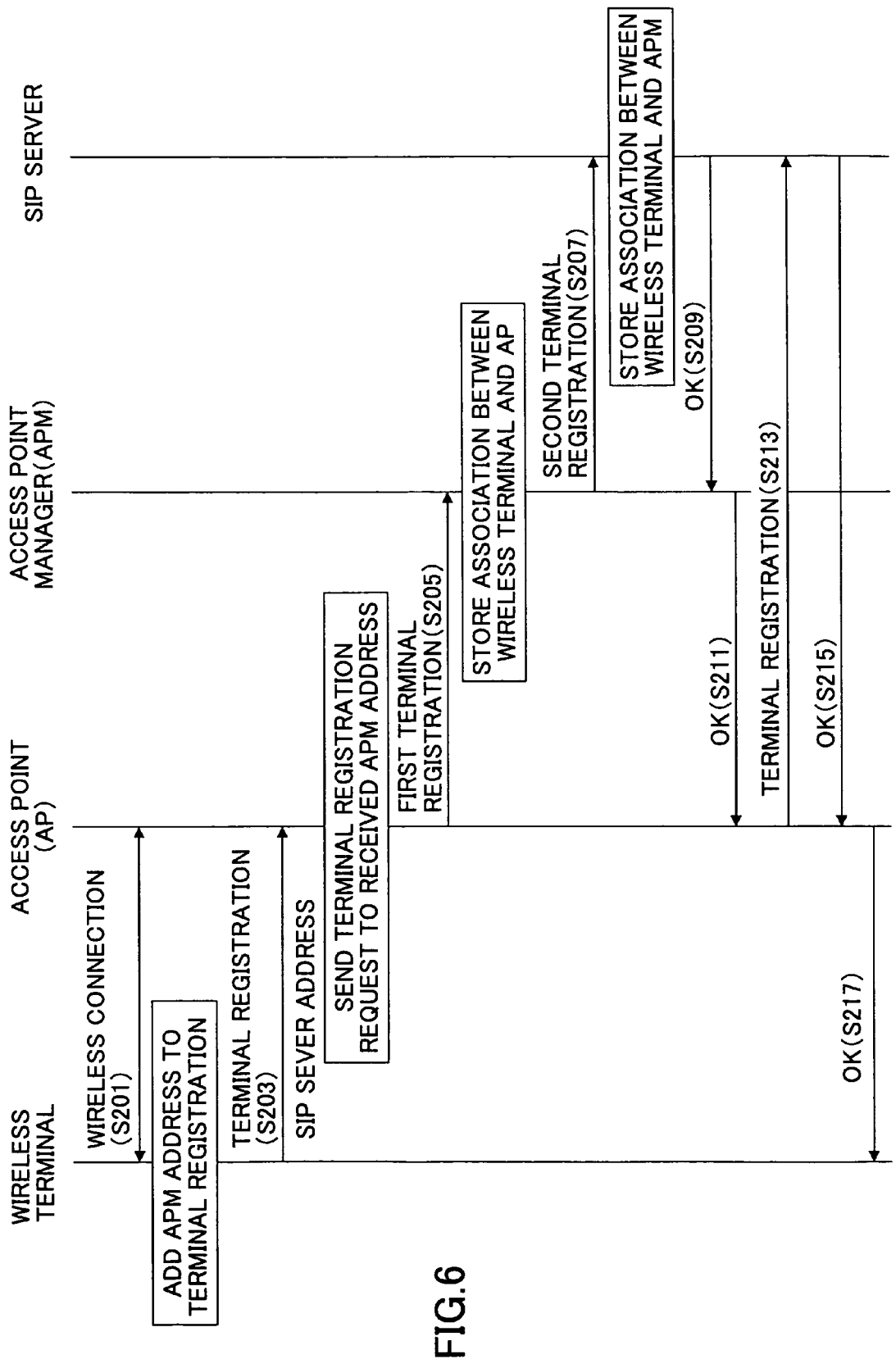
FIG. 6 is a flowchart showing process procedure of the communication system of the second embodiment of the present invention.

FIG. 6 shows a flowchart showing process procedure in the communication system.

When the wireless terminal connects to the access point by wireless in step 201, the wireless terminal sends a request for terminal registration to the access point with an APM address that is stored beforehand to the access point in step 203. The request for terminal registration includes an address of the SIP server. The access point sends the request for terminal registration to the access point manager specified by the APM address in step 205. Since the access point manager can know association between the wireless terminal and the access point when the access point manager receives the request for terminal registration, the access point manager stores the association and sends the request for terminal registration to the SIP server in step 207. Since the SIP server can know the association between the wireless terminal and the access point manager when receiving the request for terminal registration, the SIP server stores the association and sends OK to the access point manager as a response to the request for the terminal registration in step 209. The access point manager sends OK to the access point as a response to the request for terminal registration (S205) in step 211. Next, the access point may send a request for terminal registration to the SIP server in step 213, and the SIP server may send OK to the access point as a response in step 215. When every terminal registration ends, the access point sends OK to the wireless terminal as a response to the request for the terminal registration (S201) in step 217.

As mentioned above, according to the second embodiment, since the APM address is sent from the wireless terminal to the access point when performing terminal registration, the access point can specify the access point manager, so that the association of each apparatus can be realized. Therefore, even when the wireless terminal moves, the terminal registration is performed at the moving destination so that the association can be realized, and priority control of the VoIP communication can be realized.

Third Embodiment

In the following, the third embodiment of the present invention is described with reference to FIGS. 7 and 8. In the third embodiment, a scheme is described in which the SIP server, the access point manager, the access point and the wireless terminal can be associated with each other even in the environment shown in FIG. 2. Such association is performed in terminal registration when the wireless terminal connects to the access point by wireless. More particularly, association between the access point manager and the SIP server is stored in the access point beforehand, so that the access point derives the address of the access point manager (to be referred to as APM address hereinafter) when performing terminal registration of the wireless terminal.

Figure 7:
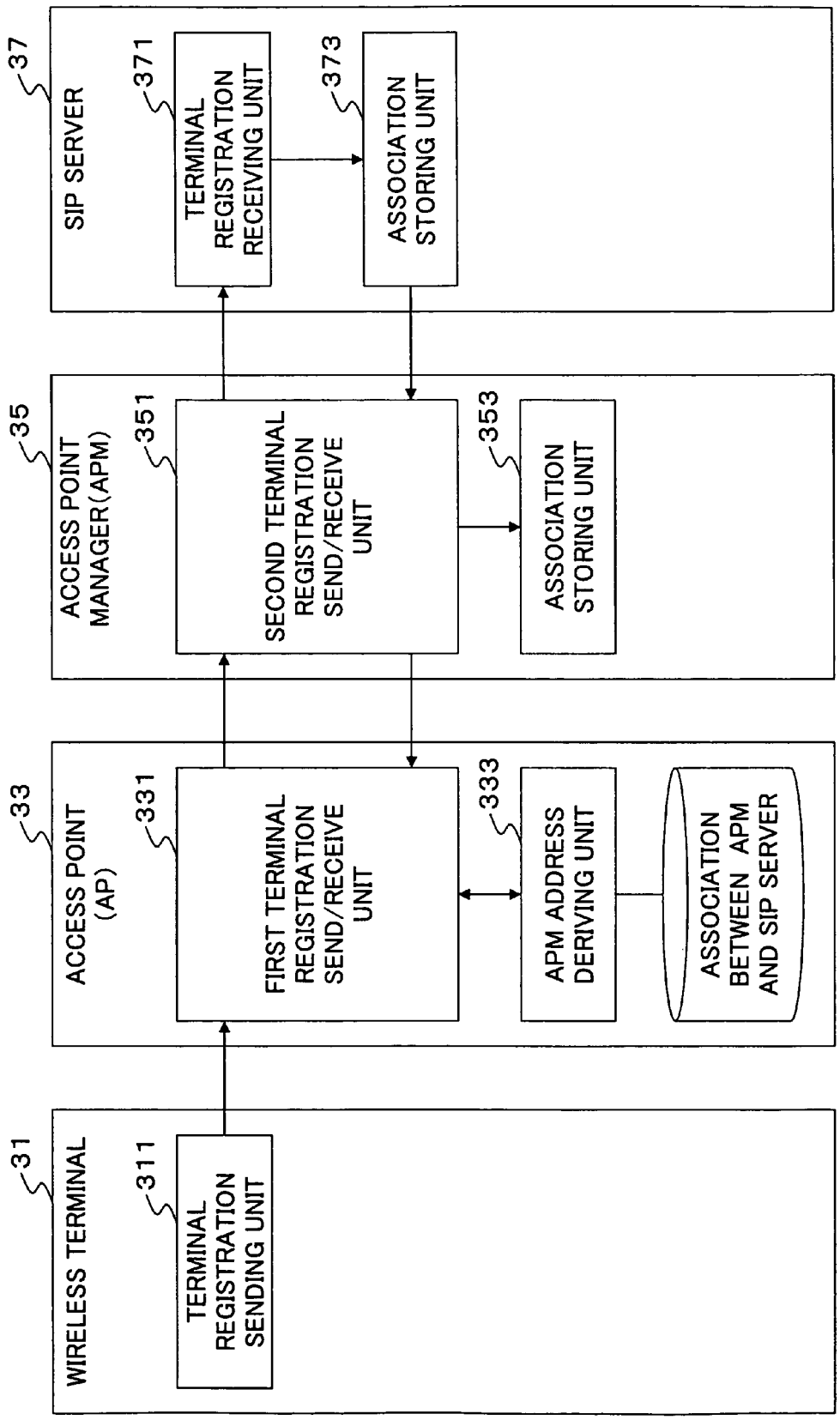
FIG. 7 is a block diagram showing the communication system of the third embodiment of the present invention.

FIG. 7 is a block diagram showing the whole of the communication system of the third embodiment. This communication system includes a wireless terminal 31, an access point 33, an access point manager 35 and a SIP server 37.

The wireless terminal 31 includes a terminal registration sending unit 311 for sending a request for terminal registration of the wireless terminal.

The access point 33 includes an APM address deriving unit 33 for deriving the APM address from pre-stored relationship between the access point manager and the SIP server when receiving the request for terminal registration from the wireless terminal 31. In addition, the access point 33 includes a first terminal send/receive unit 331 for sending the request for terminal registration to the derived APM address when receiving the request for terminal registration from the wireless terminal 31.

The APM address deriving unit may derive the APM address by referring to a table in which SIP servers are associated with access point managers, or may derive the APM address from an equation (APM address=Address of SIP server+α). For example, when the access point is placed such that it corresponds one-to-one with the SIP server, there is a high possibility that the APM address is one that is obtained by adding 1 to (or subtracting 1 from) the address of the SIP server. Thus, the APM address can be derived using the equation in such placement.

The access point manager 35 includes a second terminal registration send/receive unit 351 for sending the request for terminal registration to the SIP server 37 when receiving the request for terminal registration from the access point 33, and an association storing unit 353 for associating the wireless terminal 31 with the access point 33 and storing them when receiving the request for terminal registration from the access point 33.

The SIP server 37 includes a terminal registration receiving unit 371 for receiving the request for terminal registration from the access point manager 35, and an association storing unit 373 for associating the wireless terminal 31 with the access point manager 35 and storing them when receiving the request for terminal registration from the access point manager 35.

Figure 8:
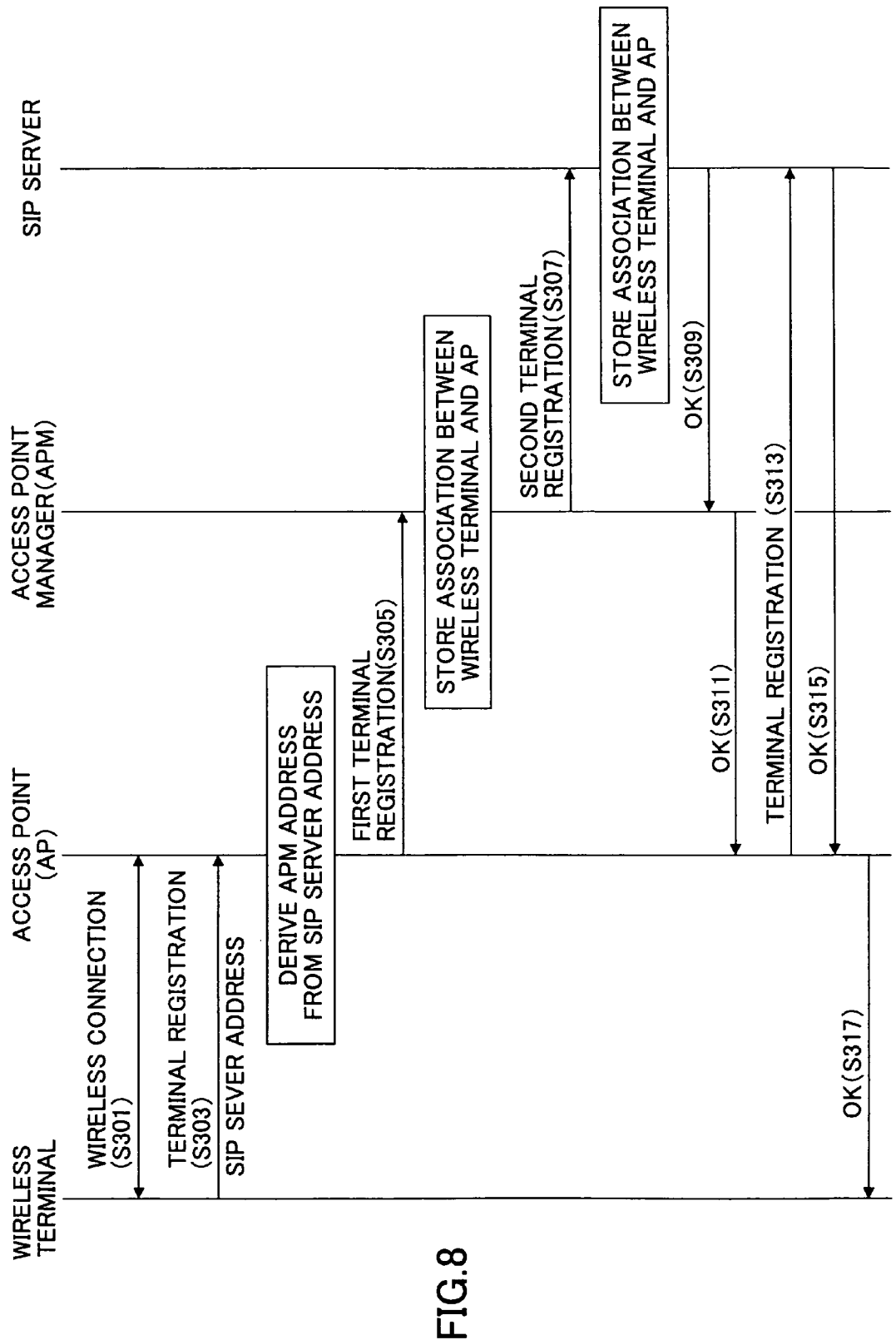
FIG. 8 is a flowchart showing process procedure of the communication system of the third embodiment of the present invention.

FIG. 8 is a flowchart showing process procedure of the communication system.

When the wireless terminal connects to the access point by wireless in step 301, the wireless terminal sends a request for terminal registration to the access point in step 303. The request for terminal registration includes the address of the SIP server. Since the access point can know the address of the SIP server, the access point derives the APM address from pre-stored relationship between the access point and the SIP server, and sends the request for terminal registration to the derived APM address in step 305. After that, processes the same as those of the second embodiment (after S207) are performed.

As mentioned above, according to the third embodiment, since the access point can derive the APM address when performing terminal registration, association of each apparatus can be realized. Therefore, even when the wireless terminal moves, the terminal registration is performed at the moving destination so that the association can be performed, and priority control of the VoIP communication can be realized.

Fourth Embodiment

In the following, the fourth embodiment of the present invention is described with reference to FIGS. 9 and 10. In the fourth embodiment, a scheme is described in which the SIP server, the access point manager, the access point and the wireless terminal can be associated with each other even in the environment shown in FIG. 2. Such association is performed in terminal registration when the wireless terminal connects to the access point by wireless. More particularly, an address of the access point manager (to be referred to as APM address hereinafter) is stored beforehand in the access point, so that the access point specifies the access point manager when performing terminal registration of the wireless terminal.

Figure 9:
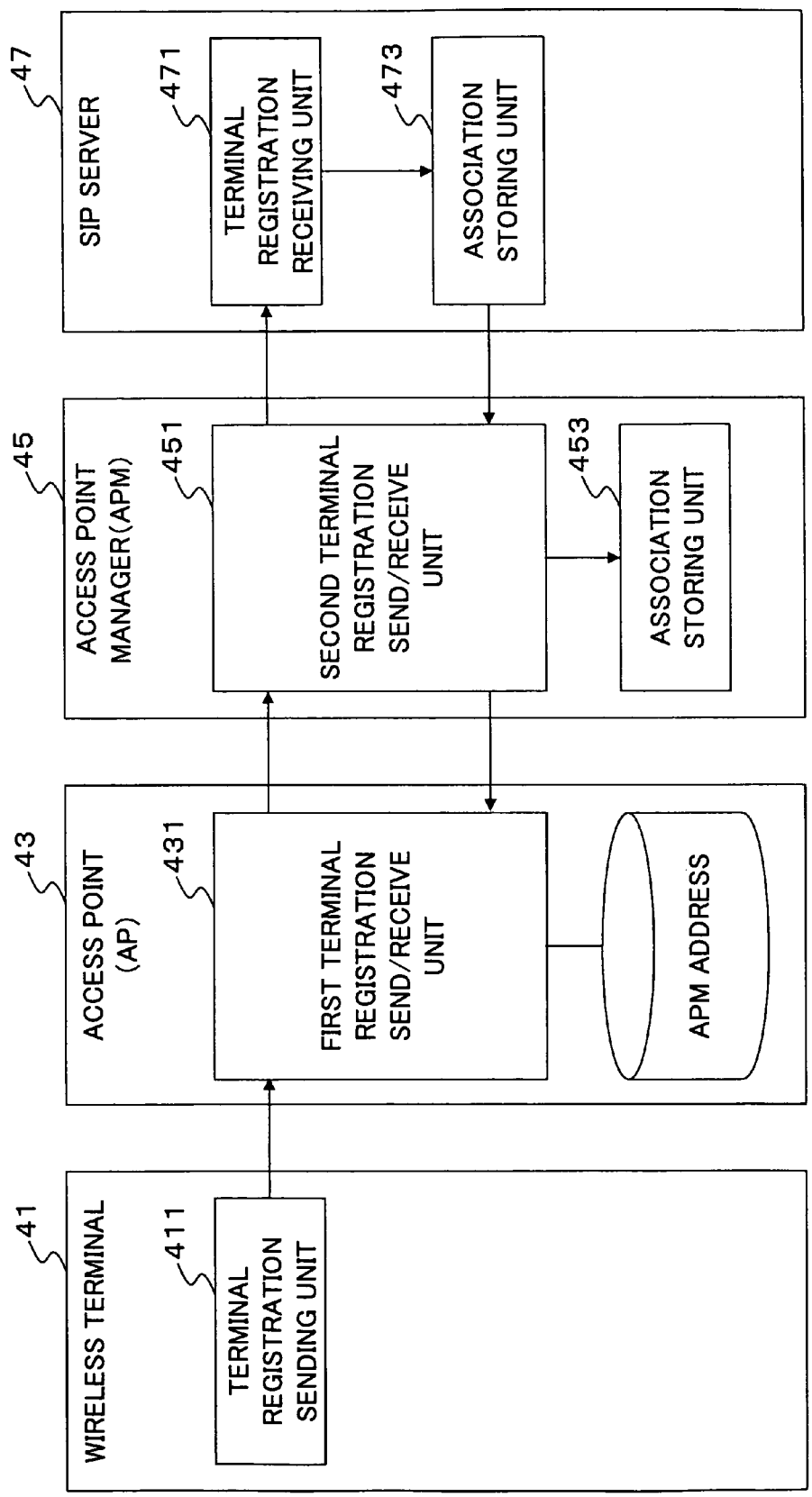
FIG. 9 is a block diagram showing the communication system of the fourth embodiment of the present invention.

FIG. 9 is a block diagram showing the whole of the communication system of the fourth embodiment of the present invention. This communication system includes a wireless terminal 41, an access point 43, an access point manager 45 and a SIP server 47.

The wireless terminal 41 includes a terminal registration sending unit 411 for sending a request for terminal registration of the wireless terminal.

The access point 43 includes a first terminal registration send/receive unit 431 for sending the request for terminal registration to the pre-stored APM address when receiving the request for terminal registration from the wireless terminal 41.

The access point manager 45 includes a second terminal registration send/receive unit 451 for sending a request for terminal registration to the SIP server 47 when receiving the request for terminal registration from the access point 43, and an association storing unit 453 for associating the wireless terminal 41 with the access point 43 and storing them when receiving the request for terminal registration from the access point 43.

The SIP server 47 includes a terminal registration receiving unit 471 for receiving the request for terminal registration from the access point manager 45, and an association storing unit 473 for associating the wireless terminal 41 with the access point manager 45 and storing them when receiving the request for terminal registration from the access point manager 45.

Figure 10:
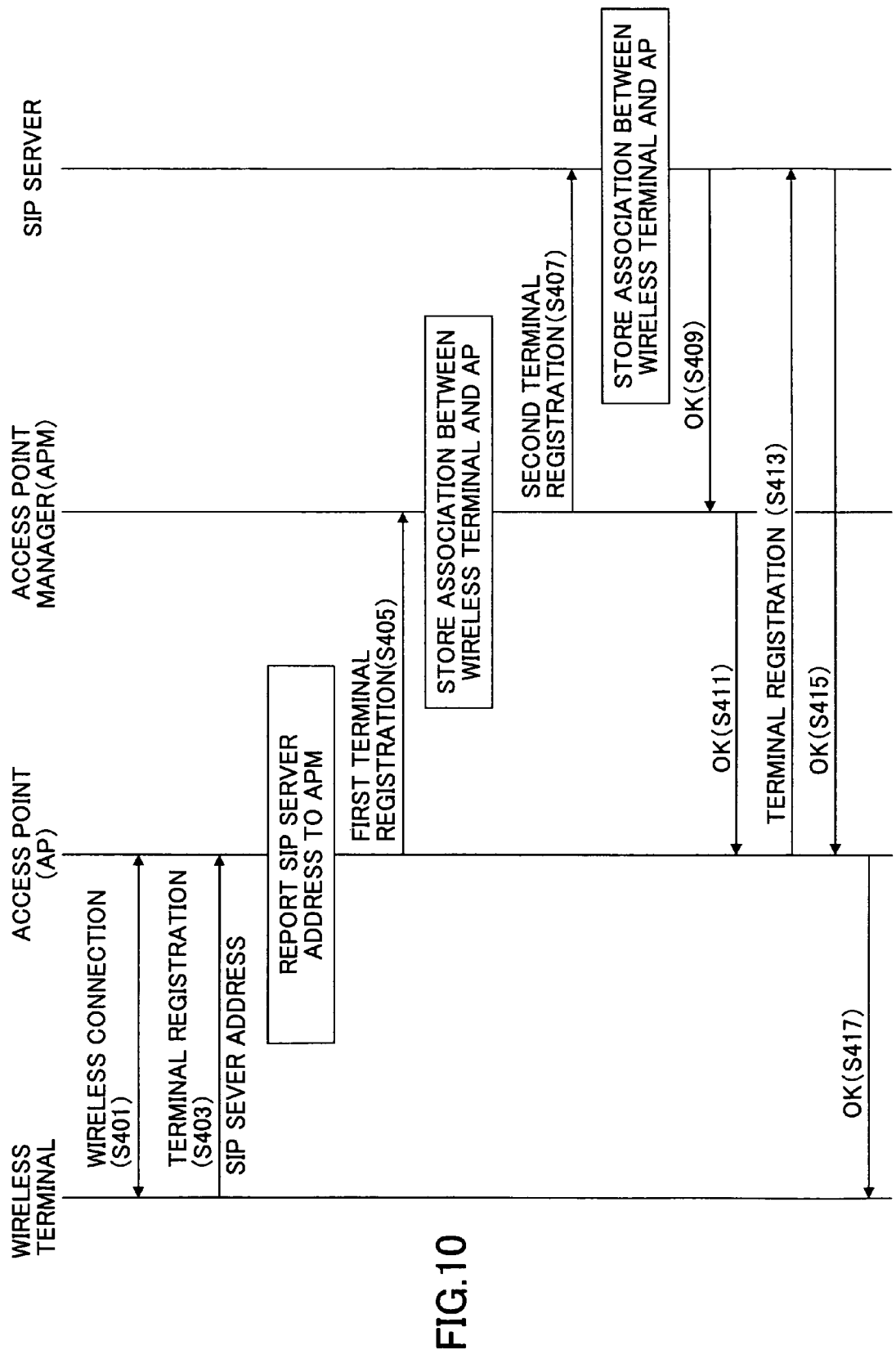
FIG. 10 is a flowchart showing process procedure of the communication system of the fourth embodiment of the present invention.

FIG. 10 is a flowchart showing process procedure of the communication system.

When the wireless terminal connects to the access point by wireless in step 401, the wireless terminal sends a request for terminal registration to the access point in step 403. The request for terminal registration includes the address of the SIP server. The access point sends the request for terminal registration including the address of the SIP server to the pre-stored APM address in step 405. After that, processes similar to those of the second embodiment (after S207) are performed.

As mentioned above, according to the fourth embodiment, since the access point can send the request for terminal registration to the pre-stored APM address when performing terminal registration, association of each apparatus can be realized. Therefore, even when the wireless terminal moves, the terminal registration is performed at the moving destination so that the association can be performed, and priority control of the VoIP communication can be realized.

Fifth Embodiment

In the following, the fifth embodiment of the present invention is described with reference to FIGS. 11 and 12. In the fourth embodiment, the address of the access point manager (to be referred to as APM address hereinafter) is pre-stored. In the fifth embodiment, a scheme is described in which failure states of APMs are determined so that terminal registration is performed when a plurality of APM addresses are pre-stored.

Figure 11:
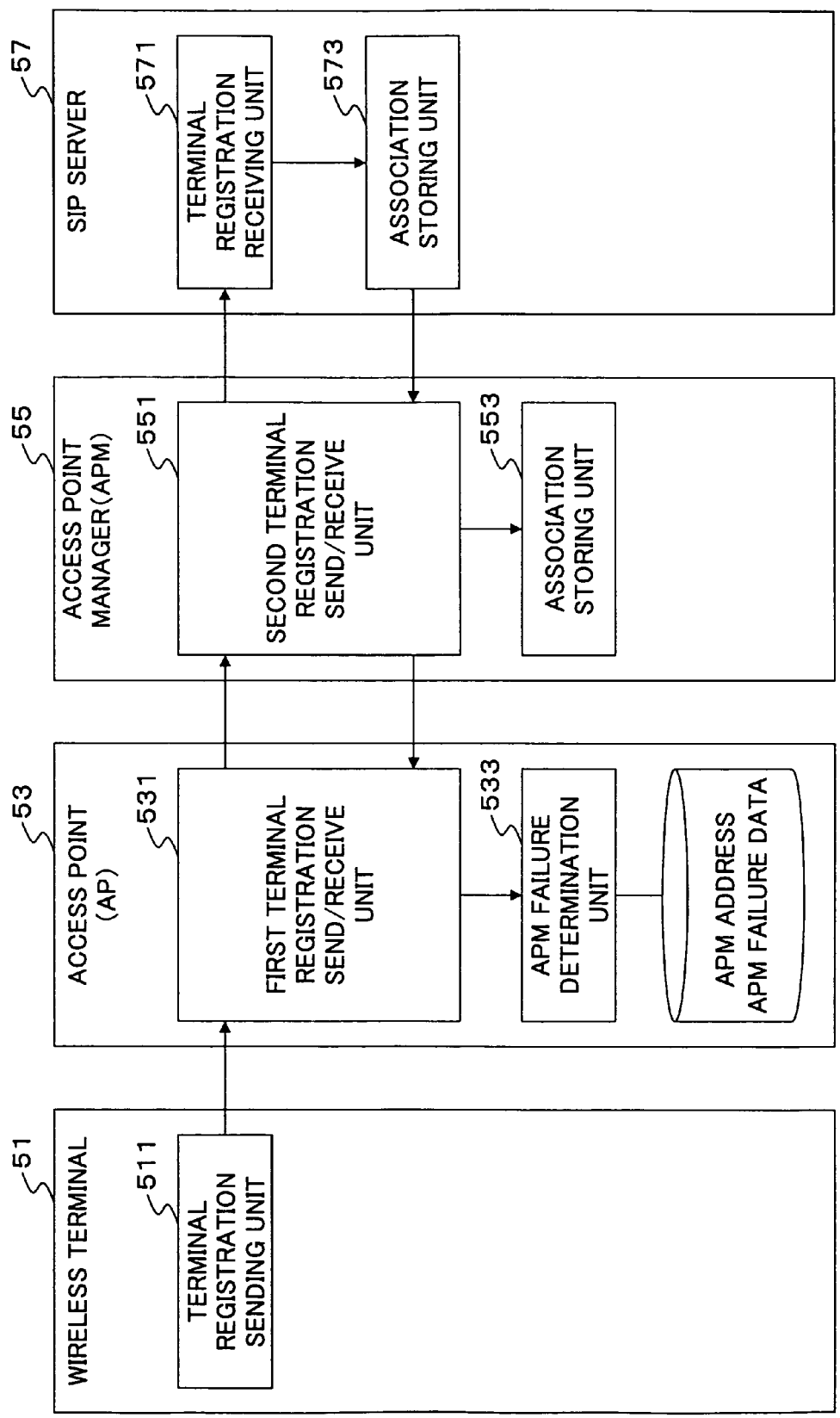
FIG. 11 is a block diagram showing the communication system of the fifth embodiment of the present invention.

FIG. 11 is a block diagram showing the whole of the communication system of the fifth embodiment of the present invention. This communication system includes a wireless terminal 51, an access point 53, an access point manager 55 and a SIP server 57.

Since units other than the APM failure determination unit 533 in the access point 53 are the same as corresponding units in FIG. 9, descriptions for these are not given. The access point 53 stores failure data of the access point managers by associating the data with the APM addresses. For storing the failure data, the access point may use a phenomenon that there is no response for a request to the access point manager, or may use reports from a monitoring apparatus, or may use manual input by a maintenance person. When receiving the request for terminal registration from the wireless terminal 51, the APM failure determination unit 533 checks association between the APM address and the failure data of the access point manager so as to determine whether an access point manager is in failure.

The APM addresses stored in the access point 53 may be addresses of redundant access point managers, or may be arbitrary APM addresses. As a method for selecting an access point that is not in failure, a method called round robin can be used.

Figure 12:
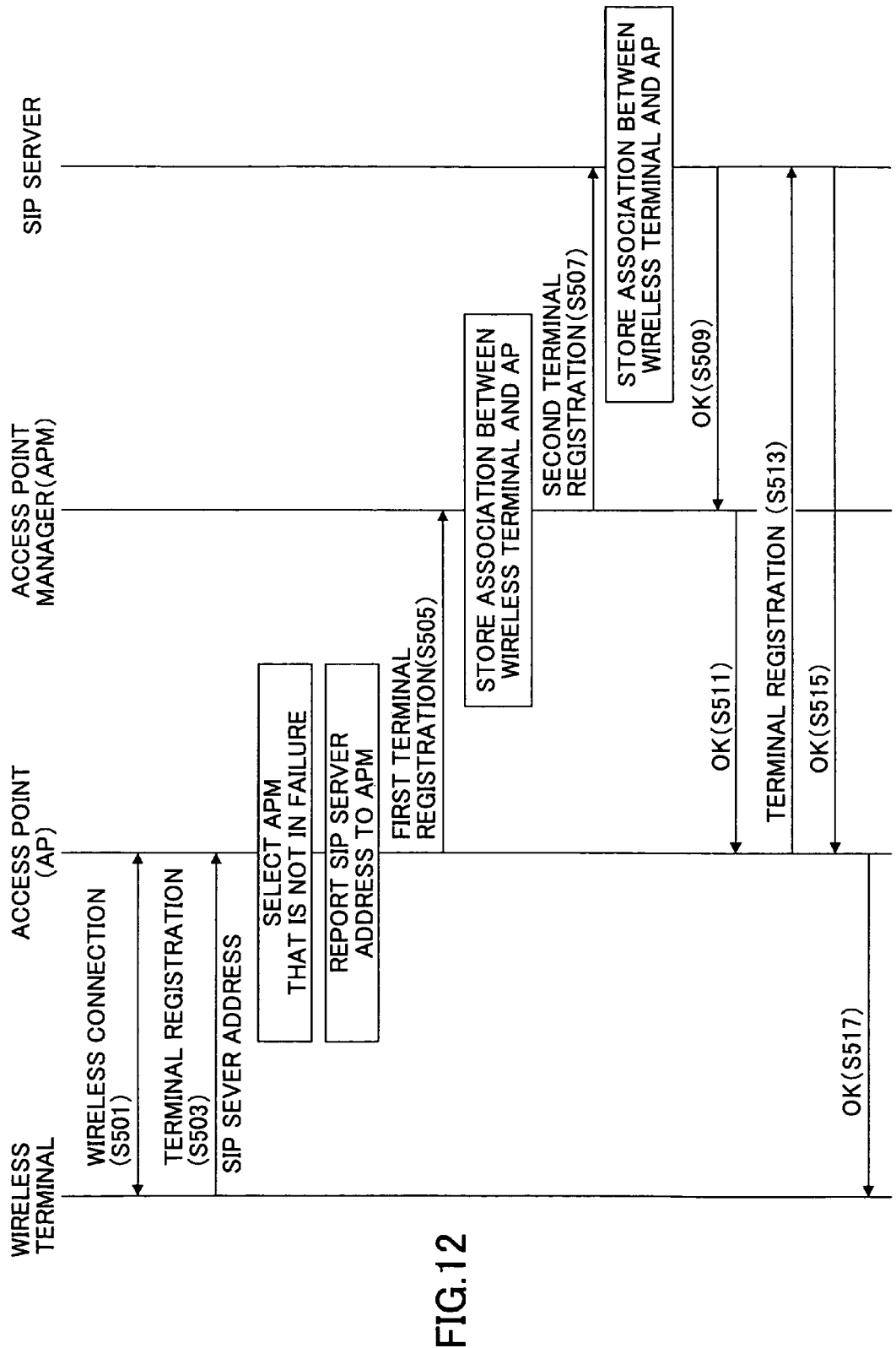
FIG. 12 is a flowchart showing process procedure of the communication system of the fifth embodiment of the present invention.

FIG. 12 is a flowchart showing process procedure of the communication system.

When the wireless terminal connects to the access point by wireless in step 501, the wireless terminal sends a request for terminal registration to the access point in step 503. The request for terminal registration includes the address of the SIP server. The access point determines an access point manager that is not in failure from pre-stored APM addresses so as to send a request for terminal registration including the address of the SIP server to the determined access point manager in step 505. After that, processes similar to those of the fourth embodiment (after S407) are performed.

As mentioned above, according to the fifth embodiment, since the access point can send the request for terminal registration to an access point manager that is not in failure when performing terminal registration. Therefore, even when the wireless terminal moves, the terminal registration is performed at the moving destination so that the association can be performed, and priority control of the VoIP communication can be realized.

The SIP server may be also referred to as a communication management apparatus, the access point manager may be also referred to as a bandwidth allocation management apparatus, and the access point may be also referred to as a relay apparatus.

The present invention is not limited to the specifically disclosed embodiments, and variations and modifications may be made without departing from the scope of the present invention.

The present application contains subject matter related to Japanese patent application No. 2006-086529, filed in the JPO on Mar. 27, 2006, the entire contents of which are incorporated herein by reference.

What is claimed is:

1. A method of associating a wireless terminal, a relay apparatus, a communication management apparatus, and a bandwidth allocation management apparatus, comprising:
    relaying by a first relay apparatus communication between the wireless terminal and another wireless terminal;
    establishing by the communication management apparatus communication connections between the wireless terminal and the other wireless terminal via the first relay apparatus;
    managing by the bandwidth allocation management apparatus bandwidth allocation of the first relay apparatus in accordance with a bandwidth allocation request from the communication management apparatus;

establishing by the wireless terminal first association with the first relay apparatus, the bandwidth allocation management apparatus, and the communication management apparatus; and when the wireless terminal moves from a receiving range of the first relay apparatus to a receiving range of a second relay apparatus, establishing by the wireless terminal second association with the second relay apparatus, the bandwidth allocation management apparatus which has been associated with the first relay apparatus, and the communication management apparatus which has been associated with the first relay apparatus, the method further comprising:

sending by the wireless terminal a request for terminal registration including a communication management apparatus identifier to the second relay apparatus;

sending by the second relay apparatus a first request for terminal registration of the wireless terminal to the communication management apparatus specified by the communication management apparatus identifier in response to reception of the request for terminal registration;

sending by the communication management apparatus a bandwidth allocation management apparatus identifier of the bandwidth allocation management apparatus to the second relay apparatus in response to reception of the first request for terminal registration;

sending by the second relay apparatus a second request for terminal registration of the wireless terminal to the bandwidth allocation management apparatus specified by the bandwidth allocation management apparatus identifier in response to reception of the bandwidth allocation management apparatus identifier; and storing by the bandwidth allocation management apparatus association between the wireless terminal and the second relay apparatus in response to reception of the second request for terminal registration.

2. A method of associating a wireless terminal, a relay apparatus, a communication management apparatus, and a bandwidth allocation management apparatus, comprising:

relaying by a first relay apparatus communication between the wireless terminal and another wireless terminal;

establishing by the communication management apparatus communication connections between the wireless terminal and the other wireless terminal via the first relay apparatus;

managing by the bandwidth allocation management apparatus bandwidth allocation of the first relay apparatus in accordance with a bandwidth allocation request from the communication management apparatus;

establishing by the wireless terminal first association with the first relay apparatus, the bandwidth allocation management apparatus, and the communication management apparatus; and when the wireless terminal moves from a receiving range of the first relay apparatus to a receiving range of a second relay apparatus, establishing by the wireless terminal second association with the second relay apparatus, the bandwidth allocation management apparatus which has been associated with the first relay apparatus, and the communication management apparatus which has been associated with the first relay apparatus, the method further comprising:

sending by the wireless terminal a request for terminal registration including a communication management apparatus identifier of the communication management apparatus and a bandwidth allocation management apparatus identifier of the bandwidth allocation management apparatus to the second relay apparatus;

sending by the second relay apparatus a first request for terminal registration of the wireless terminal to the bandwidth allocation management apparatus specified by the bandwidth allocation management apparatus identifier in response to reception of the request for terminal registration sent by the wireless terminal;

storing by the bandwidth allocation management apparatus association between the wireless terminal and the second relay apparatus in response to reception of the first request for terminal registration;

sending by the bandwidth allocation management apparatus a second request for terminal registration of the wireless terminal to the communication management apparatus specified by the communication management apparatus identifier in response to reception of the first request for terminal registration; and storing by the communication management apparatus association between the wireless terminal and the bandwidth allocation management apparatus in response to reception of the second request for terminal registration.

3. A method of associating a wireless terminal, a relay apparatus, a communication management apparatus, and a bandwidth allocation management apparatus, comprising:

relaying by a first relay apparatus communication between the wireless terminal and another wireless terminal;

establishing by the communication management apparatus communication connections between the wireless terminal and the other wireless terminal via the first relay apparatus;

managing by the bandwidth allocation management apparatus bandwidth allocation of the first relay apparatus in accordance with a bandwidth allocation request from the communication management apparatus;

establishing by the wireless terminal first association with the first relay apparatus, the bandwidth allocation management apparatus, and the communication management apparatus; and when the wireless terminal moves from a receiving range of the first relay apparatus to a receiving range of a second relay apparatus, establishing by the wireless terminal second association with the second relay apparatus, the bandwidth allocation management apparatus which has been associated with the first relay apparatus, and the communication management apparatus which has been associated with the first relay apparatus, the method further comprising:

sending by the wireless terminal a request for terminal registration including a communication management apparatus identifier of the communication management apparatus to the second relay apparatus;

deriving by the second relay apparatus a bandwidth allocation management apparatus identifier of the bandwidth allocation management apparatus from the communication management apparatus identifier in response to reception of the request for terminal registration;

sending by the second relay apparatus a first request for terminal registration of the wireless terminal to the bandwidth allocation management apparatus specified by the derived bandwidth allocation management apparatus identifier;

storing by the bandwidth allocation management apparatus association between the wireless terminal and the second relay apparatus in response to reception of the first request for terminal registration;

sending by the bandwidth allocation management apparatus a second request for terminal registration to the communication management apparatus specified by the communication management apparatus identifier; and storing by the communication management apparatus association between the wireless terminal and the bandwidth allocation management apparatus in response to reception of the second request for terminal registration.

4. A method of associating a wireless terminal, a relay apparatus, a communication management apparatus, and a bandwidth allocation management apparatus, comprising:

relaying by a first relay apparatus communication between the wireless terminal and another wireless terminal;

establishing by the communication management apparatus communication connections between the wireless terminal and the other wireless terminal via the first relay apparatus;

managing by the bandwidth allocation management apparatus bandwidth allocation of the first relay apparatus in accordance with a bandwidth allocation request from the communication management apparatus;

establishing by the wireless terminal first association with the first relay apparatus, a first bandwidth allocation management apparatus, and the communication management apparatus; and when the wireless terminal moves from a receiving range of the first relay apparatus to a receiving range of a second relay apparatus, establishing by the wireless terminal second association with the second relay apparatus, a second bandwidth allocation management apparatus associated with the second relay apparatus, and the communication management apparatus which has been associated with the first relay apparatus, the method further comprising:

sending by the wireless terminal a request for terminal registration including a communication management apparatus identifier of the communication management apparatus to the second relay apparatus;

sending by the second relay apparatus a first request for terminal registration of the wireless terminal including the communication management apparatus identifier of the communication management apparatus to the second bandwidth allocation management apparatus associated with the second relay apparatus in response to reception of the request for terminal registration sent by the wireless terminal;

storing by the second bandwidth allocation management apparatus association between the wireless terminal and the second relay apparatus in response to reception of the first request for terminal registration;

sending by the second bandwidth allocation management apparatus a second request for terminal registration of the wireless terminal to the communication management apparatus specified by the communication management apparatus identifier; and storing by the communication management apparatus association between the wireless terminal and the second bandwidth allocation management apparatus in response to reception of the second request for terminal registration.

5. The method as claimed in claim 4, further comprising:

determining by the second relay apparatus whether the second bandwidth allocation management apparatus is in failure, and sending the first request for terminal registration of the wireless terminal to a third bandwidth allocation management apparatus that is not in failure.

6. A communication system, comprising:

a first relay apparatus that relays communication between a wireless terminal and another wireless terminal;

a communication management apparatus that establishes communication connections between the wireless terminal and the other wireless terminal via the first relay apparatus;

a bandwidth allocation management apparatus that manages bandwidth allocation of the first relay apparatus in accordance with a bandwidth allocation request from the communication management apparatus;

wherein the wireless terminal establishes first association with the first relay apparatus, the bandwidth allocation management apparatus, and the communication management apparatus; and wherein, when the wireless terminal moves from a receiving range of the first relay apparatus to a receiving range of a second relay apparatus, the wireless terminal establishes second association with the second relay apparatus, the bandwidth allocation management apparatus which has been associated with the first relay apparatus, and the communication management apparatus which has been associated with the first relay apparatus, wherein, the wireless terminal sends a request for terminal registration including a communication management apparatus identifier to the second relay apparatus;

the second relay apparatus sends a first request for terminal registration of the wireless terminal to the communication management apparatus specified by the communication management apparatus identifier in response to reception of the request for terminal registration;

the communication management apparatus sends a bandwidth allocation management apparatus identifier of the bandwidth allocation management apparatus to the second relay apparatus in response to reception of the first request for terminal registration;

the second relay apparatus sends a second request for terminal registration of the wireless terminal to the bandwidth allocation management apparatus specified by the bandwidth allocation management apparatus identifier in response to reception of the bandwidth allocation management apparatus identifier; and the bandwidth allocation management apparatus stores association between the wireless terminal and the second relay apparatus in response to reception of the second request for terminal registration.

7. A communication system, comprising:

a first relay apparatus that relays communication between the wireless terminal and another wireless terminal;

a communication management apparatus that establishes communication connections between the wireless terminal and the other wireless terminal via the first relay apparatus;

a bandwidth allocation management apparatus that manages bandwidth allocation of the first relay apparatus in accordance with a bandwidth allocation request from the communication management apparatus;

wherein the wireless terminal establishes first association with
the first relay apparatus,
the bandwidth allocation management apparatus, and
the communication management apparatus; and
wherein, when the wireless terminal moves from a receiving range of the first relay apparatus to a receiving range of a second relay apparatus, the wireless terminal establishes second association with
the second relay apparatus,
the bandwidth allocation management apparatus which has been associated with the first relay apparatus, and
the communication management apparatus which has been associated with the first relay apparatus, wherein the wireless terminal sends a request for terminal registration including a communication management apparatus identifier of the communication management apparatus and a bandwidth allocation management apparatus identifier of the bandwidth allocation management apparatus to the second relay apparatus;
the second relay apparatus sends a first request for terminal registration of the wireless terminal to the bandwidth allocation management apparatus specified by the bandwidth allocation management apparatus identifier in response to reception of the request for terminal registration sent by the wireless terminal;
the bandwidth allocation management apparatus stores association between the wireless terminal and the second relay apparatus in response to reception of the first request for terminal registration;
the bandwidth allocation management apparatus sends a second request for terminal registration of the wireless terminal to the communication management apparatus specified by the communication management apparatus identifier in response to reception of the first request for terminal registration; and
the communication management apparatus stores association between the wireless terminal and the bandwidth allocation management apparatus in response to reception of the second request for terminal registration.

8. A communication system, comprising:
a first relay apparatus that relays communication between the wireless terminal and another wireless terminal;
a communication management apparatus that establishes communication connections between the wireless terminal and the other wireless terminal via the first relay apparatus;
a bandwidth allocation management apparatus that manages bandwidth allocation of the first relay apparatus in accordance with a bandwidth allocation request from the communication management apparatus;
wherein the wireless terminal establishes first association with
the first relay apparatus,
the bandwidth allocation management apparatus, and
the communication management apparatus; and
wherein, when the wireless terminal moves from a receiving range of the first relay apparatus to a receiving range of a second relay apparatus, the wireless terminal establishes second association with
the second relay apparatus,
the bandwidth allocation management apparatus which has been associated with the first relay apparatus, and
the communication management apparatus which has been associated with the first relay apparatus, wherein the wireless terminal sends a request for terminal registration including a communication management apparatus identifier of the communication management apparatus to the second relay apparatus;
the second relay apparatus derives a bandwidth allocation management apparatus identifier of the bandwidth allocation management apparatus from the communication management apparatus identifier in response to reception of the request for terminal registration;
the second relay apparatus sends a first request for terminal registration of the wireless terminal to the bandwidth allocation management apparatus specified by the derived bandwidth allocation management apparatus identifier;
the bandwidth allocation management apparatus stores association between the wireless terminal and the second relay apparatus in response to reception of the first request for terminal registration;
the bandwidth allocation management apparatus sends a second request for terminal registration to the communication management apparatus specified by the communication management apparatus identifier; and
the communication management apparatus stores association between the wireless terminal and the bandwidth allocation management apparatus in response to reception of the second request for terminal registration.

9. A communication system, comprising:
a first relay apparatus that relays communication between the wireless terminal and another wireless terminal;
a communication management apparatus that establishes communication connections between the wireless terminal and the other wireless terminal via the first relay apparatus;
the bandwidth allocation management apparatus that manages bandwidth allocation of the first relay apparatus in accordance with a bandwidth allocation request from the communication management apparatus;
wherein the wireless terminal establishes first association with
the first relay apparatus,
a first bandwidth allocation management apparatus, and
the communication management apparatus; and
wherein, when the wireless terminal moves from a receiving range of the first relay apparatus to a receiving range of a second relay apparatus, the wireless terminal establishes second association with
the second relay apparatus,
a second bandwidth allocation management apparatus associated with the second relay apparatus, and
the communication management apparatus which has been associated with the first relay apparatus, wherein the wireless terminal sends a request for terminal registration including a communication management apparatus identifier of the communication management apparatus to the second relay apparatus;
the second relay apparatus sends a first request for terminal registration of the wireless terminal including the communication management apparatus identifier of the communication management apparatus to the second bandwidth allocation management apparatus associated with the second relay apparatus in response to reception of the request for terminal registration sent by the wireless terminal;
the second bandwidth stores allocation management apparatus association between the wireless terminal and the second relay apparatus in response to reception of the first request for terminal registration;
the second bandwidth allocation management apparatus sends a second request for terminal registration of the wireless terminal to the communication management apparatus specified by the communication management apparatus identifier; and the communication management apparatus stores association between the wireless terminal and the second bandwidth allocation management apparatus in response to reception of the second request for terminal registration.

* * * * *